Feb. 21, 1950
G. W. MORK ET AL
2,497,900
FAIRLEAD FOR SEMITRAILER SCRAPERS OR WAGONS
Filed Dec. 3, 1945
3 Sheets-Sheet 1
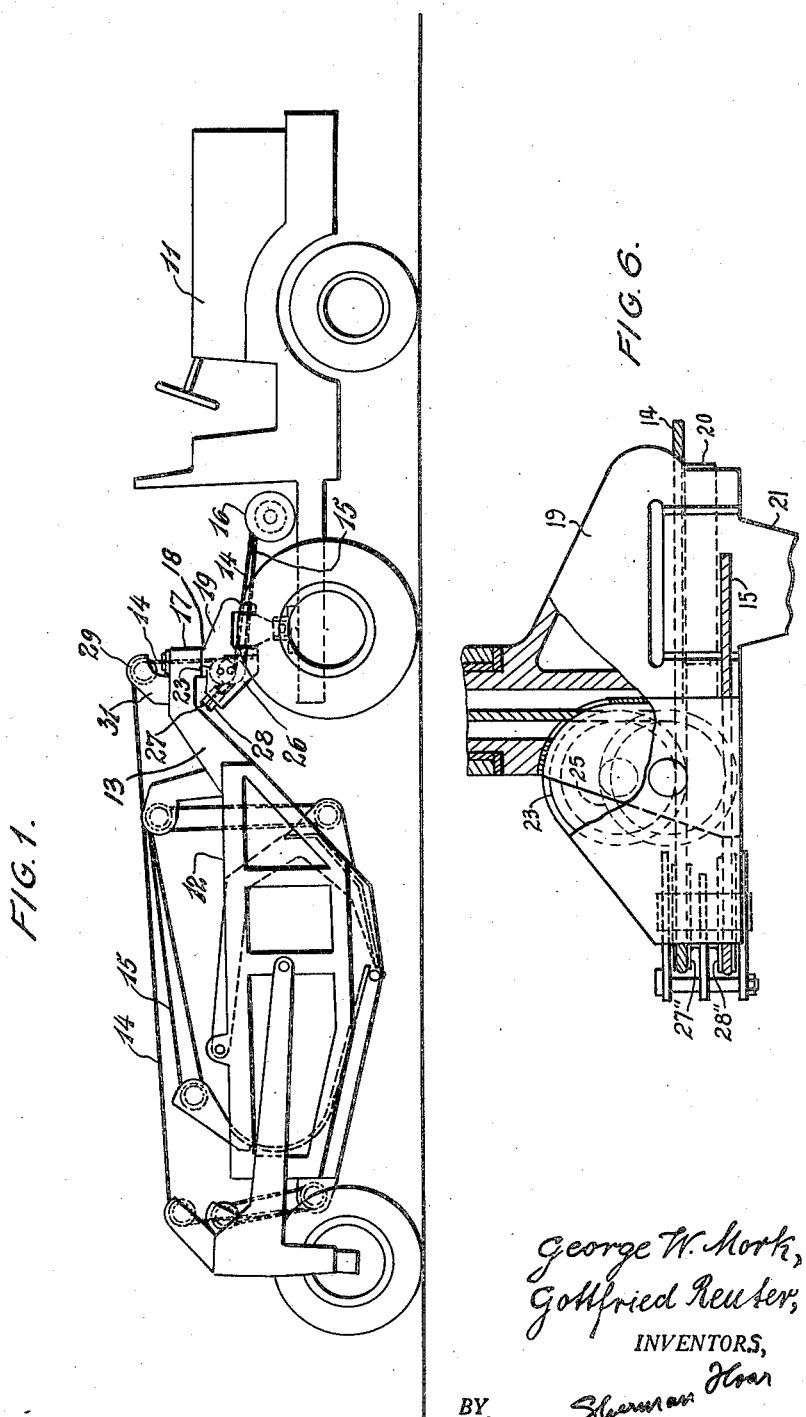
George W. Mork,
Gottfried Reuter,
INVENTORS,
BY Roger Sherman Hoar
ATTORNEY.

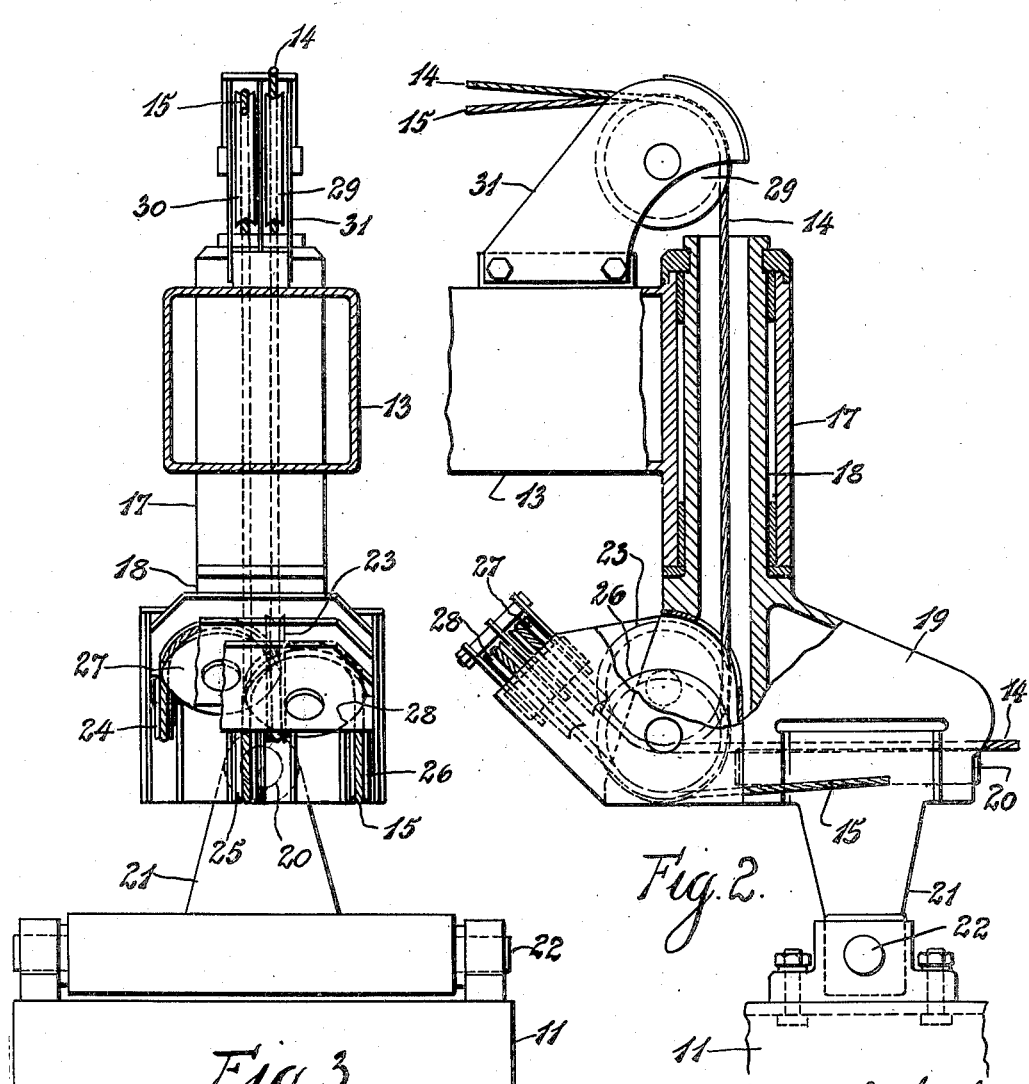

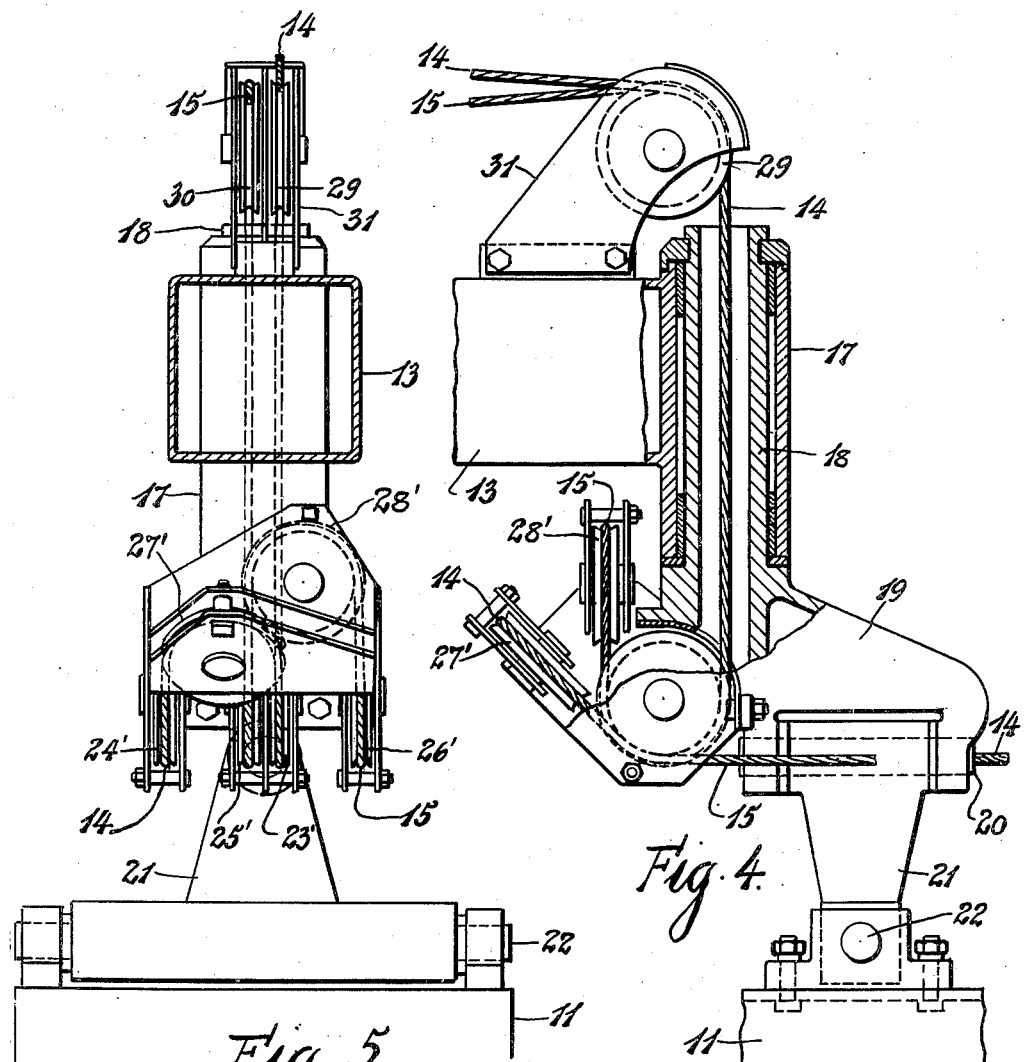

Patented Feb. 21, 1950

2,497,900

UNITED STATES PATENT OFFICE

2,497,900

FAIRLEAD FOR SEMITRAILER SCRAPERS OR WAGONS

George W. Mork and Gottfried Reuter, South Milwaukee, Wis., assignors to Bucyrus-Erie Company, South Milwaukee, Wis., a corporation of Delaware Application December 3, 1945, Serial No. 632,290

13 Claims. (Cl. 254—190)

Our invention relates to new and useful improvements in fairleads; and more particularly in fairleads to lead the control ropes from the towing vehicle, past the joint between that vehicle and the towed instrumentality, to the towed instrumentality; and still more particularly when the towing vehicle is a tractor, and the towed instrumentality is a semi-trailer dirt-moving scraper or wagon.

The joint between a towing tractor and a towed semi-trailer scraper or wagon is usually universal, so as to accommodate the irregularity of the ground over which such combinations usually operate. Hence it is the principal object of our invention to provide, adjacent this juncture, a fairlead such that two control-ropes can pass from the tractor to the trailer without interference with each other or with any parts of the two vehicles; and furthermore so that the relative motion of the two vehicles will not materially shorten or lengthen the effective length of either rope, thereby setting up an unwanted control.

In addition to the objects above stated, we have worked out a number of novel and useful details, which will be readily evident as the description progresses.

Our invention consists in the novel parts, and in the combination and arrangement thereof, which are defined in the appended claims, and of which one embodiment is exemplified in the accompanying drawings, which is hereinafter particularly described and explained.

Throughout the description, the same reference number is applied to the same member or to similar members.

Referring now to the accompanying drawings, it will be seen that:

Figure 1 is a side elevation, somewhat conventionalized, of a tractor and semi-trailer scraper, equipped with one variant of our fairlead.

Figure 2 is an enlarged side elevation of that variant, and of the adjacent joint between tractor and trailer, partly in section.

Figure 3 is a rear elevation of the same, showing the gooseneck of the trailer in section.

Figure 4 is an enlarged side elevation of a second variant of our fairlead, and of the adjacent joint between tractor and trailer, partly in section.

Figure 5 is a rear elevation of the same, showing the gooseneck of the trailer in section.

Figure 6 is an enlarged side elevation of a third variant of our fairlead, based on Figure 2, and showing only so much of the third variant as differs from Figure 2, together with sufficient associated parts to render clear its operation.

Referring now to Figure 1, we see that 11 is a conventionalized representation of a tractor, and that 12 is a slightly conventionalized representation of a semi-trailer scraper of the general type exemplified by U. S. Patent No. 2,321,410, to Mork and Baranowski. The gooseneck 13 of the scraper 12 is universally attached to the tractor 11. Two control ropes 14, 15 pass from two-drum winch 16 on the tractor 11, over sheaves which will be hereinafter explained, to the various controlled mechanisms of the scraper.

Turning now to Figures 2 and 3, we see that gooseneck 13 of the scraper, terminates in a hollow cylindrical vertical portion 17, which is mounted for swiveling on a vertical axis about hollow cylindrical post 18.

Integral with the lower portion of this post, there is a bracket 19, which has a longitudinal horizontal swivel connection 20 with a connecting piece 21. This connecting piece in turn is mounted for swiveling about a transverse horizontal swivel 22, on the rear end of tractor 11. Swivels 20 and 22 together constitute a gimbal joint tractor and trailer.

It will be noted that there are four pairs of sheaves, the location of which will now be described.

Sheaves 23 to 28 are mounted in the bracket 19. Of these, sheaves 23 to 26 are parallel, vertical, and longitudinal; sheaves 23 and 24 having coaxial axles, and sheaves 25 and 26 having coaxial axles slightly lower. Sheaves 27 and 28 are parallel, transverse, and inclined at about 45° from the horizontal. Their parallel axles are laterally spaced.

Sheaves 29 and 30 are mounted in bracket 31 on gooseneck 13. They are parallel, vertical, longitudinal, and coaxial.

Rope 14 passes from the winch 16 (see Figure 1), under sheave, 24, around sheave 27, under sheave 23, up through the hollow in post 18, over sheave 29, and thence to the parts of the scraper 12 to be controlled thereby.

Rope 15 passes from said winch 16, under sheave 26, around sheave 28, under sheave 25, up through post 18, over sheave 30, and thence to the parts of the scraper 12 to be controlled thereby.

For ready distinguishment in the claims, we shall call 18—19 the "first member," and we shall call 13—17 the "second member," and we shall call sheaves 23 to 26 "longitudinal sheaves mounted on the first member," and shall call sheaves 27 and 28 "cross-over sheaves," and shall call sheaves 29 and 30 "longitudinal sheaves mounted on the second member."

Sheaves 27 and 28 need not necessarily be inclined. All that is required is that their plane and the lead of ropes 14 and 15 to the fairlead from the winch should form a sufficient angle to keep these ropes from coming off sheaves 24 and 26 respectively.

It will be noted that ropes 14 and 15 cross each other within our fairlead. That is to say: rope 14 starts to the left of rope 15 and emerges to the right of rope 15.

If will further be noted that the bottom edges of sheaves 24 and 26 are approximately on a level with swivel 20 which in turn is on a level with that portion of the surface of the drums of the winch from which the ropes 14 and 15 run to the fairlead. This location of parts causes this reach of these ropes to be substantially horizontal, and to avoid interference with bracket 19 or connecting piece 21 during relative sidewise tipping of tractor and trailer.

Turning now to Figures 4 and 5, we shall see that the second variant of our invention is identical to our first variant, except as to the six sheaves which are mounted in bracket 19. These six sheaves will be numbered the same as their counterparts, but will be primed for ready distinguishment.

Sheave 28' is now vertical and transverse. This change in orientation permits mounting sheaves 23' and 24' coaxial with sheaves 25' and 26', instead of on axes above them: a great simplification in construction, which furthermore permits the bottom edges of both of these sheaves to be on a level with swivel 20, hence augmenting the horizontality of the adjacent leads of ropes 14 and 15, for the attainment of the function already referred to in connection with our first variant.

It should be noted that the only object of longitudinal sheaves 24 and 26 of our first variant is to lead the respective ropes to sheaves 27 and 28 respectively. If the angle of movement about pin 20 is expected to be slight, or if the distance from the fairlead to the winch, or other rope-leading means on the towing vehicle, is long, sheaves 24 and 26 could be omitted, as shown in Figure 6, in which event sheaves 27" and 28" should have the same inclinations as their respective ropes.

Having now described and illustrated three forms of our invention, we wish it to be understood that our invention is not to be limited to the specific form or arrangement of parts herein described and shown.

We claim:

1. In a fairlead, the combination of: a first member; a second member swively connected thereto; and two trains of four sheaves each, each train having its sheaves lined up for the successive passage of a rope in the following order: a first longitudinal sheave, mounted on the first member and having its axis perpendicular to the swivel axis, a cross-over sheave mounted on the first member, a second longitudinal sheave, mounted in the first member and having its axis perpendicular to the swivel axis, and a third longitudinal sheave, mounted on the second member and having its axis perpendicular to the swivel axis; the four sheaves being so proportioned and relatively located that the cross-over sheave lies in a plane substantially tangent to the peripheries of the first and second longitudinal sheaves, and each of these two longitudinal sheaves lies in a plane substantially tangent to the periphery of the cross-over sheave, and the second and third longitudinal sheaves have a substantially common tangent in all relative positions of the two members.

2. A fairlead according to claim 1, further characterized by the fact that the second longitudinal sheave and the third longitudinal sheave of each train are so located that their common tangent is substantially parallel to the swivel axis.

3. A fairlead according to claim 1, further characterized by the fact that the swivel joint is hollow, and that the second longitudinal sheave and the third longitudinal sheave of each train are so located that their common tangent passes through said hollow.

4. A fairlead according to claim 1, further characterized by having a supporting gimbal joint attached to the first member, the two axes of said gimbal joint being each perpendicular to the swivel axis, one of the two axes of the gimbal joint being longitudinal and the other being transverse.

5. A fairlead according to claim 4, further characterized by the fact that the gimbal joint lies clear of the plane of the first longitudinal sheave of each train, so that the rope running to this sheave from outside the fairlead will clear the gimbal joint laterally.

6. A fairlead according to claim 1, further characterized by having a supporting gimbal joint attached to the first member, the two axes of said gimbal joint being each perpendicular to the swivel axis, one of the two axes of the gimbal joint being longitudinal and the other being transverse, and by the fact that the cross-over sheave of each train is substantially inclined toward the swivel axis from the inclination of the longitudinal axis of the gimbal joint.

7. In a fairlead, the combination of: a first member; a second member swively connected thereto; and a train of four sheaves, which four sheaves are lined up for the successive passage of a rope in the following order: a first longitudinal sheave, mounted on the first member and having its axis perpendicular to the swivel axis, a cross-over sheave mounted on the first member, a second longitudinal sheave, mounted on the first member and having its axis perpendicular to the swivel axis, and a third longitudinal sheave, mounted on the second member and having its axis perpendicular to the swivel axis; the four sheaves being so proportioned and relatively located that the cross-over sheave lies in a plane substantially tangent to the peripheries of the first and second longitudinal sheaves, and each of these two longitudinal sheaves lies in a plane substantially tangent to the periphery of the cross-over sheave, and the second and third longitudinal sheaves have a substantially common tangent in all relative positions of the two members.

8. In a fairlead, the combination of: a first member; a second member swively connected thereto; and two trains of three sheaves each, each train having its sheaves lined up for the successive passage of a rope in the following order: a cross-over sheave mounted on the first member, a longitudinal sheave mounted on the first member and having its axis perpendicular to the swivel axis, and a longitudinal sheave mounted on the second member and having its axis perpendicular to the swivel axis, the three sheaves being so proportioned and relatively located that the cross-over sheave lies in a plane substantially tangent to the periphery of the longitudinal sheave mounted on the first member, and said last named longitudinal sheave lies in a plane substantially tangent to the periphery of the cross-over sheave, and, the two longitudinal sheaves have a substantially common tangent in all relative positions of the two members; and a supporting gimbal joint attached to the first member, the two axes of said gimbal joint being each perpendicular to the swivel axis.

9. A fairlead according to claim 8, further characterized by the fact that the two axes of said gimbal joint are each perpendicular to the swivel axis, and by the fact that the two cross-over sheaves are so spaced that ropes running to them from outside the fairlead will clear the gimbal joint laterally.

10. A fairlead according to claim 1, further characterized by the fact that, in each train, the first and second longitudinal sheaves are coaxial, and that these two sheaves of one train are nearer to the third longitudinal sheaves of both trains than are the first and second longitudinal sheaves of the other train.

11. A fairlead according to claim 10, further characterized by the fact that the cross-over sheave of the one train is likewise nearer to the third longitudinal sheaves of both trains than is the cross-over sheave of the other train.

12. A fairlead according to claim 1, further characterized by having a supporting gimbal joint attached to the first member, the two axes of said gimbal joint being each perpendicular to the swivel axis, one of the two axes of the gimbal joint being longitudinal and the other being transverse, and by the fact that the cross-over sheave of each train is substantially inclined toward the swivel axis from the inclination of the longitudinal axis of the gimbal joint, the cross-over sheave of one train being more inclined than the cross-over sheave of the other train.

13. A fairlead according to claim 12, further characterized by the fact that the first and second longitudinal sheaves of both trains are all coaxial.

GEORGE W. MORK.
GOTTFRIED REUTER.

REFERENCES CITED

The following references are of record in the file of this patent:

UNITED STATES PATENTS

| Number | Name | Date |
| --- | --- | --- |
| 1,577,404 | Zerbe | Mar. 16, 1926 |
| 2,006,388 | Ellis | July 2, 1935 |
| 2,107,118 | Knapp | Feb. 1, 1938 |
| 2,289,337 | Beitzel | July 14, 1942 |
| 2,343,894 | Fisher | Mar. 14, 1944 |